INVENTORS
Douglas O. Baird
Lloyd R. Zumwalt
BY
ATTORNEY.

United States Patent Office 2,843,451
Patented July 15, 1958

2,843,451
PROCESSES OF RECOVERING URANIUM FROM A CALUTRON

Douglas O. Baird, Berkeley, Calif., and Lloyd R. Zumwalt, Oak Ridge, Tenn., assignors to the United States of America as represented by the United States Atomic Energy Commission Application August 16, 1944, Serial No. 549,780

15 Claims. (Cl. 23—14.5)

The present invention relates to processes of recovering uranium from a calutron and more particularly to improvements in certain steps of the process disclosed in the copending application of James M. Carter and Martin D. Kamen, Serial No. 532,159, filed April 21, 1944, which issued as Patent No. 2,758,006 on September 18, 1956.

It is an object of the invention to provide an improved process of reclaiming uranium from a calutron.

Another object of the invention is to provide an improved process of recovering the residue of a uranium compound which has been subjected to treatment in a calutron from the parts of the calutron disposed in the source region thereof upon which the residue is deposited.

Another object of the invention is to provide an improved process of recovering metallic uranium enriched with $U^{235}$ from the collector of a calutron upon which the enriched metallic uranium is deposited.

A further object of the invention is to provide an improved process of purifying uranium which has been recovered from a calutron.

A still further object of the invention is to provide a process of reclaiming uranium from a wash solution derived from a calutron, in which the uranium is precipitated away from metal impurities in the wash solution as sodium uranyl acetate.

Figure 1:
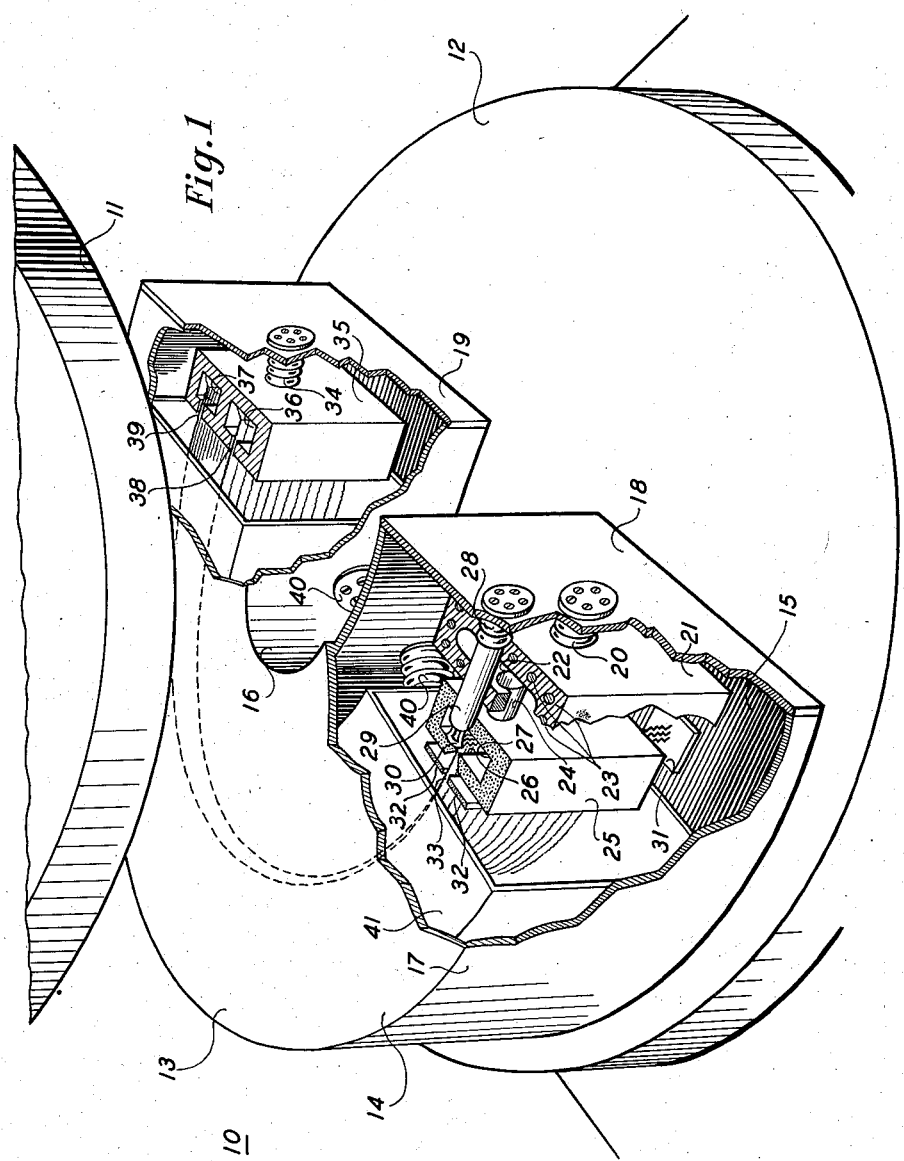
Figure 2:
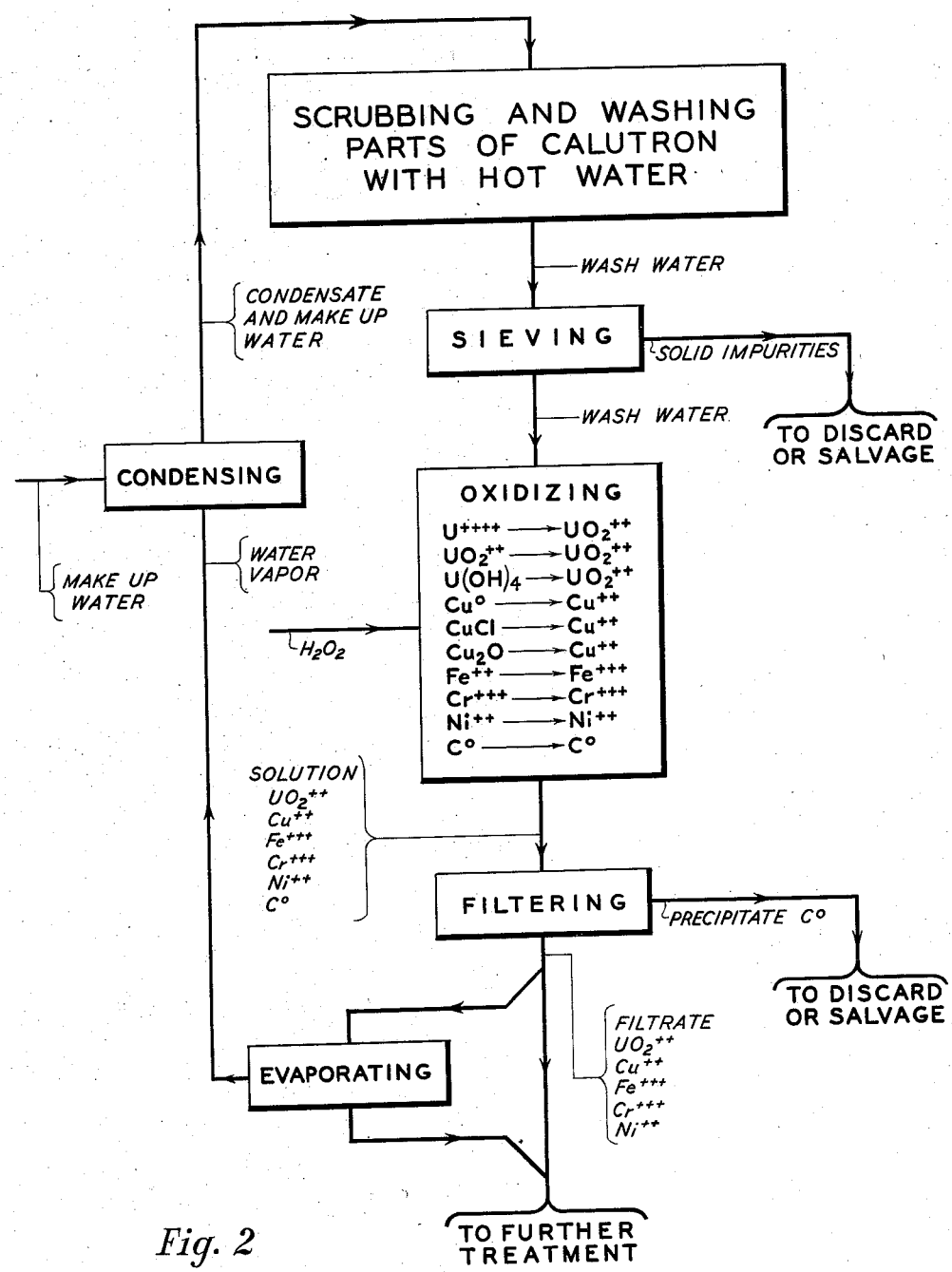
Figure 3:
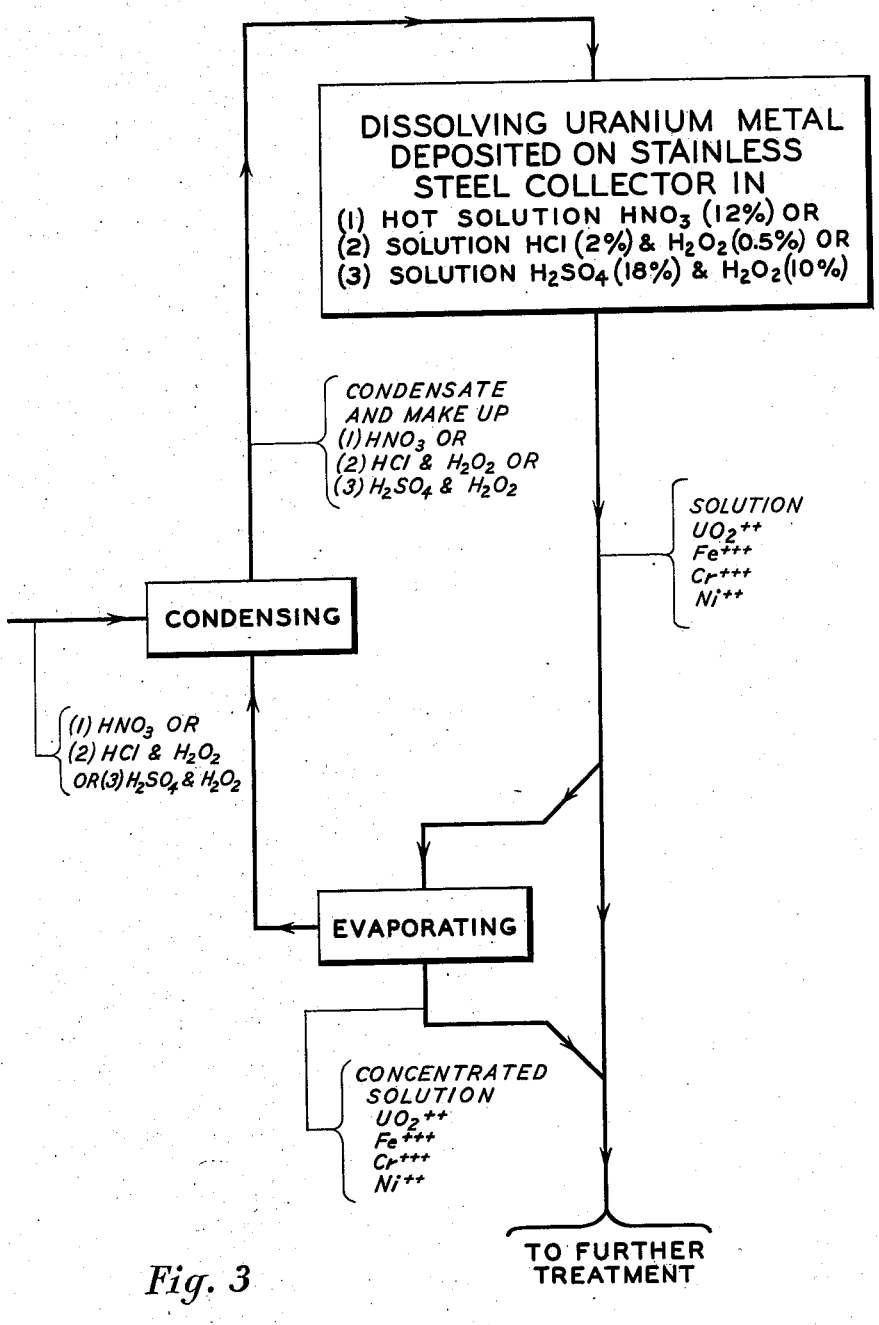
Figure 4:
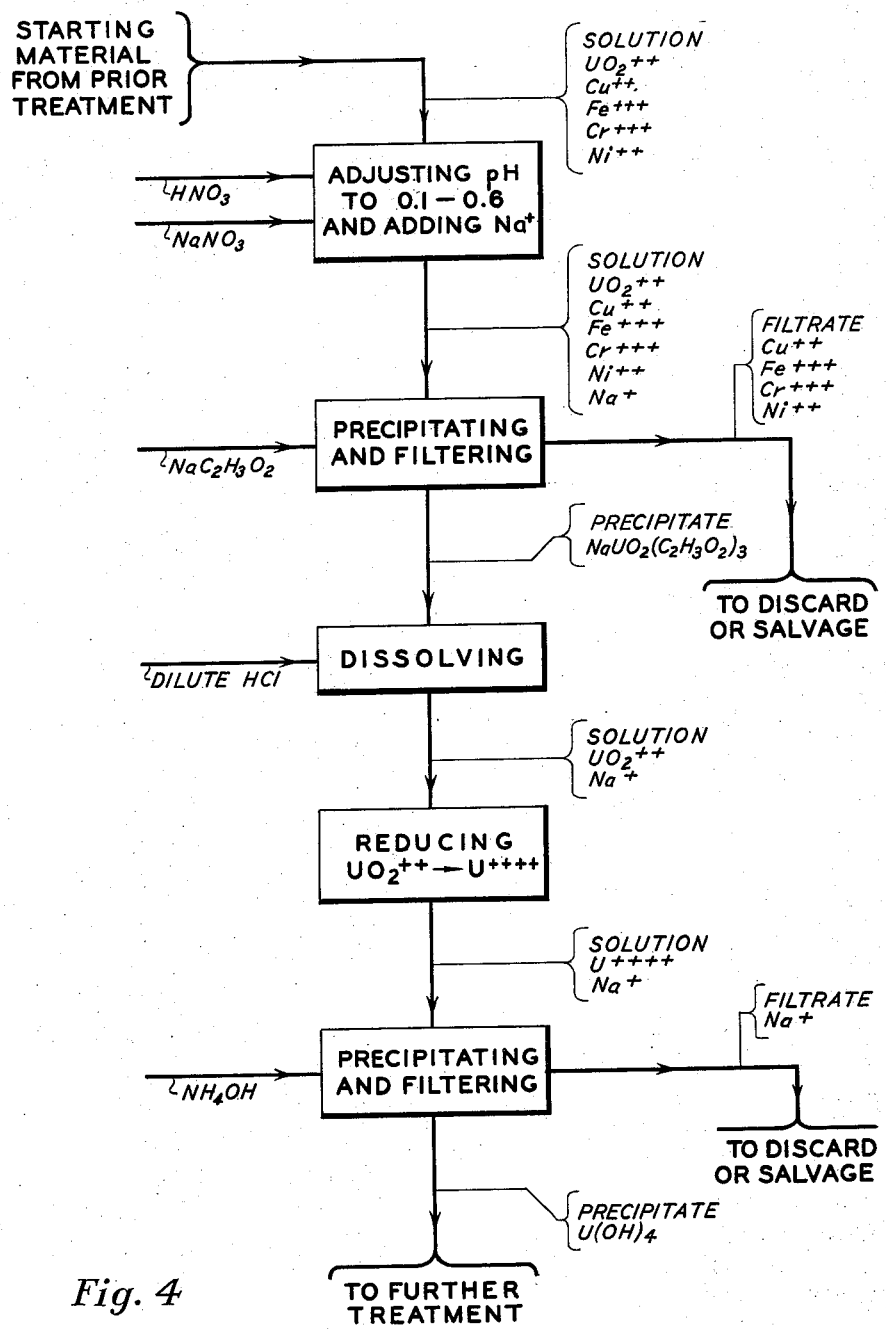
Figure 5:
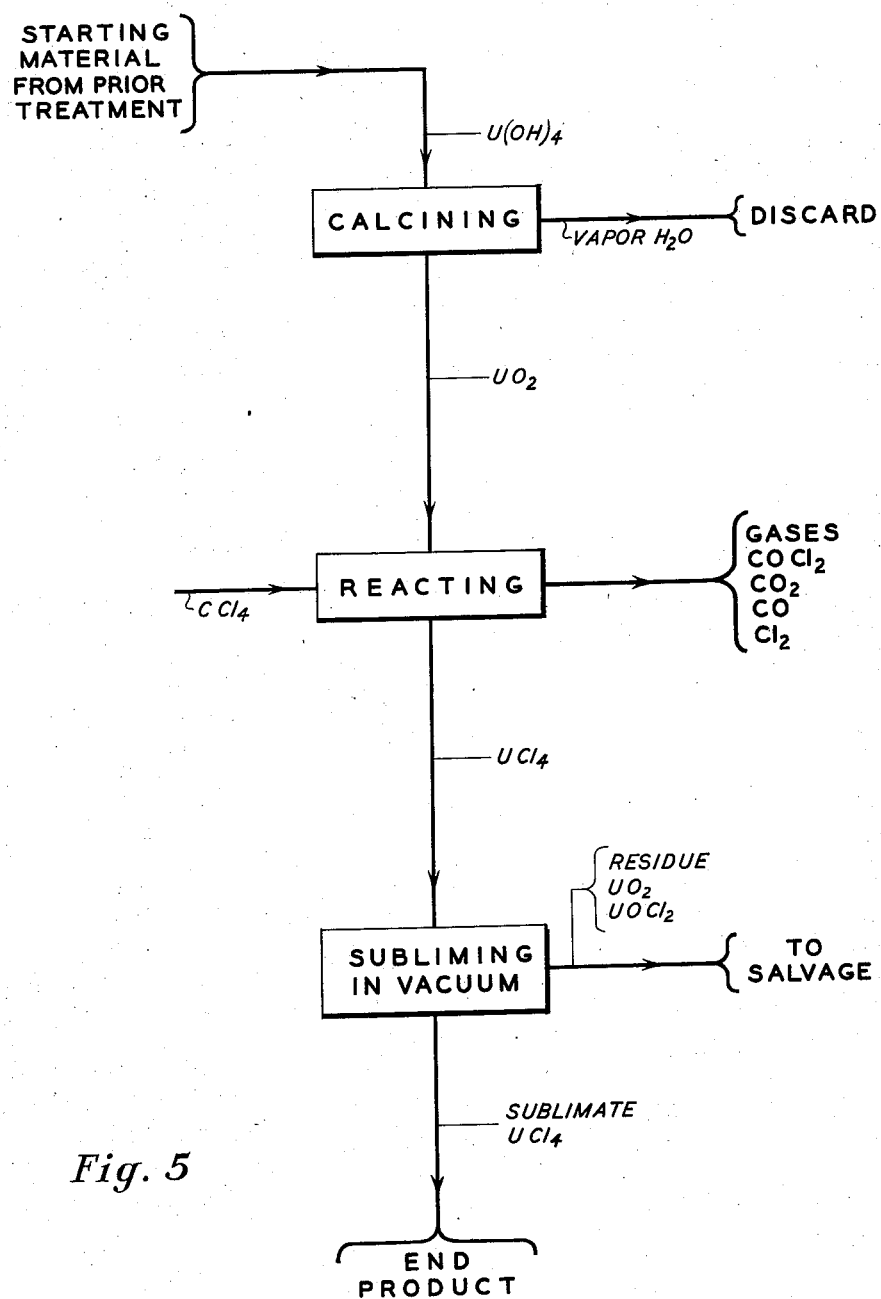

The invention both as to its organization and method of operation, together with further objects and advantages thereof, will best be understood by reference to the following specification taken in connection with the accompanying drawings in which Figure 1 is a perspective view, partly broken away, of a calutron in conjunction with which there may be carried out the process of the present invention; Fig. 2 illustrates a portion of the flow diagram of the present process, indicating the recovery of the residue of $UCl_4$ from the parts of the calutron disposed in the source region thereof upon which it is deposited; Fig. 3 illustrates another portion of the flow diagram of the present process, indicating the recovery of the metallic uranium from the collector of the calutron upon which it is deposited; Fig. 4 illustrates a further portion of the flow diagram of the present process, indicating the purification of the recovered uranium; and Fig. 5 illustrates a still further portion of the flow diagram of the present process, indicating the ultimate conversion of the purified uranium back to $UCl_4$.

At the outset, it is noted that a "calutron" is a machine of the character of that disclosed in the copending application of Ernest O. Lawrence, Serial No. 557,784, filed October 9, 1944, which issued as Patent No. 2,709,222 on May 24, 1955, and is employed to separate the constituent isotopes of an element and more particularly to increase the proportion of a selected isotope in an element containing a plurality of isotopes in order to produce the element enriched with the selected isotope. For example, the machine is especially useful in producing uranium enriched with $U^{235}$.

Such a calutron essentially comprises means for vaporizing a quantity of material containing an element which is to be enriched with a selected one of its several isotopes; means for subjecting the vapor to ionization, whereby at least a portion of the vapor is ionized causing ions of the several isotopes of the element to be produced; electrical means for segregating the ions from the unionized vapor and for accelerating the segregated ions to relatively high velocities; electromagnetic means for deflecting the ions along curved paths, the radii of curvature of the paths of ions being proportional to the square roots of the masses of the ions, whereby the ions are concentrated in accordance with their masses; and means for de-ionizing and collecting the ions of the selected isotope thus concentrated, thereby to produce a deposit of the element enriched with the selected isotope.

Referring now more particularly to Fig. 1, there is illustrated a typical example of a calutron 10 of the character noted, which comprises magnetic field structure including upper and lower pole pieces 11 and 12, provided with substantially flat parallel spaced-apart pole faces, and a tank 13 disposed between the pole faces of the pole pieces 11 and 12. The pole pieces 11 and 12 carry windings, not shown, which are adapted to be energized in order to produce a substantially uniform and relatively strong magnetic field therebetween, which magnetic field passes through the tank 13 and the various parts housed therein. The tank 13 is of tubular configuration, being substantially crescent-shaped in plan, and comprising substantially flat parallel spaced-apart top and bottom walls 14 and 15, upstanding curved inner and outer walls 16 and 17, and end walls 18 and 19. The end walls 18 and 19 close the opposite ends of the tubular tank 13 and are adapted to be removably secured in place, whereby the tank 13 is hermetically sealed. Also, vacuum pumping apparatus, not shown, is associated with the tank 13, whereby the interior of the tank 13 may be evacuated to a pressure of the order of $10^{-5}$ to $10^{-4}$ mm. Hg. Preferably, the component parts of the tank 13 are formed of steel, the bottom wall 15 thereof resting directly upon the pole face of the lower pole piece 12, and the top wall 14 thereof being spaced a suitable distance from the pole face of the upper pole piece 11, whereby the top and bottom walls 14 and 15 constitute in effect pole pieces with respect to the interior of the tank 13, as explained more fully hereinafter.

The removable end wall 18 carries an insulator 20 which supports an upstanding charge block 21, provided with a hollow central cavity 22 constituting a charge receiving pocket surrounded by rather thick side walls. Electrical heating elements 23 are embedded in the side walls of the charge block 21 and are adapted to be connected to a suitable source of current, whereby the charge block 21 may be appropriately heated, the charge block 21 being formed of cast steel or the like. Also, the charge block 21 is provided with a removable cover, not shown, and supports a tubular member 24 which in turn supports an arc block 25 formed of carbon or graphite. The arc block 25 is substantially C-shaped in plan, an upstanding slot 26 being formed in the wall thereof remote from the charge block 21. Thus, the arc block 25 is of hollow construction, having a central arc cavity 27 formed therein, the arc cavity 27 formed in the arc block 25 communicating through the tubular member 24 with the cavity 22 formed in the charge block 21.

Also, the removable end wall 18 carries an insulator 28, disposed above the insulator 20, which supports horizontally projecting cathode structure 29, including a filamentary cathode 30 adapted to be connected to a suitable source of current. The cathode structure 29 projects over the upper end of the charge block 21, whereby the filamentary cathode 30 overhangs and is aligned with respect to the upper end of the cavity 27 formed in the arc block 25. Further, an anode 31 is arranged below and in alignment with respect to the lower end of the cavity 27 formed in the arc block 25, the anode 31 being supported by the charge block 21. The filamentary cathode 30 and the cooperating anode 31 are adapted to be connected to a suitable source of current.

Ion accelerating structure, including a pair of upstanding plates 32 formed of carbon or graphite, is supported by insulating structure, not shown, carried by the removable end wall 18. The pair of upstanding plates 32 are arranged in spaced-apart relation in order to define a slit 33 therebetween, arranged in substantial alignment with respect to the slot 26 formed in the wall of the arc block 25. A suitable source of voltage is adapted to be connected between the arc block 25 and the ion accelerating structure, including the plates 32, for a purpose more fully explained hereinafter.

The removable end wall 19 carries and insulator 34 which supports an upstanding collector block 35 formed of stainless steel or the like and provided with two laterally spaced-apart cavities or pockets 36 and 37 which communicate with aligned slots 38 and 39 formed in the wall of the collector block 35 disposed remote from the removable end wall 19. Alternatively, the collector block may be fabricated of steel plate and the inner surfaces of the pockets 36 and 37 lined with stainless steel plates. It is noted that the pockets 36 and 37 are adapted to receive two constituent isotopes of an element which have been separated in the calutron 10, as explained more fully hereinafter. Finally, the inner wall 16 carries a number of insulators 40 which support a tubular liner 41 formed of copper or the like, rectangular in vertical cross-section, disposed within the tank 13 and spaced from the walls 14, 15, 16 and 17 thereof. One end of the tubular liner 41 terminates adjacent the accelerating structure, including the plates 32; and the other end of the tubular liner 41 terminates adjacent the collector block 35; the tubular liner 41 constituting an electrostatic shield for the high-velocity ions traversing the curved paths between the slit 33 formed by the plates 32 of the ion accelerating structure and the slots 38 and 39 formed in the collector block 35, as explained more fully hereinafter.

In view of the above description, it will be understood that the parts of the calutron 10 carried by the removable end wall 18 constitute a source unit, and the end of the tank 13 disposed adjacent the source unit constitutes the source region of the calutron. Similarly, the parts of the calutron carried by the removable end wall 19 constitute a collector unit, and the end of the tank 13 disposed adjacent the collector unit constitutes the collector region of the calutron.

Considering now the general principle of operation of the calutron 10, a charge comprising a compound of the element to be treated is placed in the charge pocket 22 in the charge block 21, the compound of the element mentioned being one which may be readily vaporized. The cover, not shown, is then secured on the charge block 21 and the end walls 18 and 19 are securely attached to the open ends of the tank 13, whereby the tank 13 is hermetically sealed. The various electrical connections are completed and operation of the vacuum pumping apparatus, not shown, associated with the tank 13 is initiated. When a pressure of the order of $10^{-5}$ to $10^{-4}$ mm. Hg is established within the tank 13, the electric circuits for the windings associated with the pole pieces 11 and 12 are closed and adjusted, whereby a predetermined magnetic field is established therebetween, traversing the tank 13. The electric circuit for the heating elements 23 is closed, whereby the charge in the charge pocket 22 in the charge block 21 is heated and vaporized. The vapor fills the charge pocket 22 and is conducted through the tubular member 24 into the cavity 27 formed in the arc block 25. The electric circuit for the filamentary cathode 30 is closed, whereby the filamentary cathode 30 is heated and rendered electron-emissive. Then the electric circuit between the filamentary cathode 30 and the anode 31 is closed, whereby an arc discharge is struck therebetween, electrons proceeding from the filamentary cathode 30 to the anode 31. The electrons proceeding from the filamentary cathode 30 to the anode 31 break up the molecular form of the compound of the vapor to a considerable extent, producing positive ions of the element which is to be enriched with a selected one of its isotopes.

The electric circuit between the arc block 25 and the ion accelerating structure, including the plates 32, is completed, the plates 32 being at a high negative potential with respect to the arc block 25, whereby the positive ions are attracted and accelerated to the voltage impressed between the arc block 25 and the ion accelerating structure. More particularly, the positive ions proceed from the interior of the cavity 27 formed in the arc block 25, through the slot 26 formed in the wall thereof, and across the space between the plates 32 and the adjacent wall of the arc block 25, and thence through the slit 33 formed between the plates 32 into the interior of the tubular liner 41. The high-velocity positive ions form a vertical upstanding ribbon proceeding from the cavity 27 formed in the arc block 25 through the slot 26 and the aligned slit 33 into the tubular liner 41.

The collector block 35, as well as the tubular liner 41, is electrically connected to the ion accelerating structure, including the plates 32, whereby there is an electric field-free path for the high-velocity positive ions, disposed between the plates 32 and the collector block 35 within the tubular liner 41. The high-velocity positive ions entering the adjacent end of the liner 41 are deflected from their normal straight-line path and from a vertical plane, passing through the slot 26 and the slit 33, due to the effect of the relatively strong magnetic field maintained through the space within the tank 13 and the liner 41 through which the positive ions travel, whereby the positive ions describe arcs, the radii of which are proportional to the square roots of the masses of the ions and consequently of the isotopes of the element mentioned. Thus, ions of the relatively light isotope of the element describe an interior arc of relatively short radius and are focused through the slot 38 into the pocket 36 formed in the collector block 35; whereas ions of the relatively heavy isotope of the element describe an exterior arc of relatively long radius and are focused through the slot 39 into the pocket 37 formed in the collector block 35. Accordingly, the ions of the relatively light isotope of the element are collected in the pocket 36 and are de-ionized to produce a deposit of the relatively light isotope of the element therein, while the ions of the relatively heavy isotope of the element are collected in the pocket 37 and de-ionized to produce a deposit of the relatively heavy isotope of the element therein.

After all of the charge in the charge pocket 22 formed in the charge block 21 has been vaporized, all of the electric circuits are interrupted and the end wall 18 is removed so that another charge may be placed in the pocket 22 and subsequently vaporized in the manner explained above. After a suitable number of charges have been vaporized in order to obtain appropriate deposits of the isotopes of the element in the pockets 36 and 37 of the collector block 35, the end wall 19 may be removed and the deposits of the collected isotopes in the pockets 36 and 37 in the collector block 35 may be reclaimed.

Of course, it will be understood that the various dimensions of the parts of the calutron 10, the various electrical potentials applied between the various electrical parts thereof, as well as the strength of the magnetic field between the pole pieces 11 and 12, are suitably correlated with respect to each other, depending upon the mass numbers of the several isotopes of the element which is to be treated therein. In this connection, reference is again made to the copending application of Ernest O. Lawrence for a complete specification of a calutron especially designed for the production of uranium enriched with the isotope $U^{235}$. By way of illustration, it is noted that when the calutron 10 is employed in order to produce uranium enriched with $U^{235}$, the compound of uranium which is suggested as a suitable charge in the charge block 21 is $UCl_4$, as this compound may be readily vaporized and the molecular form of the vapor may be readily broken up to form positive ions of uranium with great facility. In this case, uranium enriched with $U^{235}$ is collected in the pocket 36 of the collector block 35, and uranium comprising principally $U^{238}$ is collected in the pocket 37 of the collector block 35. Also, it is noted that from a practical standpoint, the deposit of uranium collected in the pocket 36 of the collector block 35 contains considerable amounts of $U^{238}$, in view of the fact that this isotope comprises the dominant constituent of ordinary uranium. Furthermore, the deposit of uranium collected in the pocket 36 of the collector block 35 contains a considerably increased amount of $U^{234}$, in view of the fact that it is not ordinarily feasible to separate $U^{234}$ and $U^{235}$ in the production of relatively large quantities of uranium enriched with $U^{235}$ for commercial purposes. Accordingly, in this example the uranium deposited in the pocket 36 of the collector block 35 is considerably enriched, both with $U^{234}$ and $U^{235}$, and considerably impoverished with respect to $U^{238}$ as compared to natural or normal uranium.

During the operation of the calutron 10 in the production of uranium enriched with $U^{235}$, the compound $UCl_4$ is vaporized in the charge block 21 and conducted through the tubular member 24 into the cavity 27 formed in the arc block 25, where it is subjected to ionization as previously explained. Only a minor fraction (about 5%) of the $UCl_4$ vapor is actually ionized in the cavity 27 formed in the arc block 25 and drawn through the slot 26 due to the ion accelerating structure, including the plates 32. The major fraction (about 95%) of the $UCl_4$ vapor is un-ionized in the cavity 27 formed in the arc block 25 and flows through the slot 26 due to the pressure differential between the cavity 27 and the interior of the liner 41. This major fraction of the $UCl_4$ vapor, being uni-ionized, is not at all affected by the ion accelerating structure, including the plates 32, and travels into contact with the various parts of the calutron disposed in the source region thereof, upon which parts it is condensed primarily in the compound form $UCl_4$ as a residue. More particularly, this residue is condensed principally upon the interior of the adjacent end of the liner 41, but to some extent upon the exterior thereof, the walls of the tank 13 in the region of the source and upon the exterior surfaces of the various elements of the source unit including the arc block 25, the charge block 21, etc.

More particularly, the minor fraction of the $UCl_4$ vapor is ionized to form positive atomic ions including $U^+$, $U^{++}$, $Cl^+$ and $Cl^{++}$; and positive molecular ions including $Cl_2^+$, $Cl_2^{++}$, $UCl_4^+$, $UCl_4^{++}$, $UCl_3^+$, $UCl_3^{++}$, $UCl_2^+$, $UCl_2^{++}$, $UCl^+$ and $UCl^{++}$. Of these atomic and molecular ions only the singly ionized atomic ions $U^+$ have the required ratio between mass and charge such that they are focused through the slots 38 and 39 into the pockets 36 and 37 formed in the collector block 35; the atomic ions $U^+$ of masses 234 and 235 focusing through the slot 38 into the pocket 36, and the atomic ions $U^+$ of mass 238 focusing through the slot 39 into the pocket 37, as previously noted.

The doubly ionized atomic ions $U^{++}$ have such a ratio between mass and charge that they are deflected along an arc of shorter radius into engagement with the inner wall of the liner 41, where they are de-ionized to form a deposit thereon. The singly and doubly ionized atomic ions $Cl^+$ and $Cl^{++}$ and the singly and doubly ionized molecular ions $Cl_2^+$ and $Cl_2^{++}$ have such small ratios between mass and charge that they are deflected along arcs of very short radii into engagement with the inner wall of the liner 41 adjacent the source region, where they are de-ionized to form neutral chlorine molecules, which gas is subsequently pumped from the tank 13 due to the operation of the vacuum pumping apparatus previously noted. Similarly, the doubly ionized molecular ions $UCl_4^{++}$, $UCl_3^{++}$, $UCl_2^{++}$ and $UCl^{++}$ have intermediate ratios between mass and charge such that they are deflected along arcs of intermediate radii into engagement with the inner wall of the liner 41 intermediate the source region and the collector region, where they are de-ionized to form a deposit thereon. Finally, the singly ionized molecular ions $UCl_4^+$, $UCl_3^+$, $UCl_2^+$ and $UCl^+$ have large ratios between mass and charge, such that they are deflected along arcs of large radii into engagement with the outer wall of the liner 41 intermediate the source region and the collector region, where they are de-ionized to form a deposit thereon.

Accordingly, it will be understood that, after operation of the calutron 10 to vaporize a reasonable number of charges of $UCl_4$ in the charge block 21, a considerable deposit of $UCl_4$ is formed on the adjacent end of the liner 41, and that a reasonable deposit of metallic uranium, as well as the various uranium chlorides, is formed on the intermediate portion of the liner 41. These deposits represent uranium which contains the various isotopes $U^{238}$, $U^{235}$ and $U^{234}$ in natural or normal amounts such that these deposits should be recovered for recycling purposes as well as to clean the liner 41 and the other parts of the calutron 10 in order to insure efficient operation thereof.

Considering the present process in greater detail with reference to the production of uranium enriched with $U^{235}$, it is pointed out that natural or normal uranium comprises three isotopes, $U^{238}$, $U^{235}$ and $U^{234}$, in the approximate relative abundances, 1, 1/139 and 1/16,700 (in numbers of atoms with reference to $U^{238}$), respectively, or approximately 16,700, 120 and 1 atoms, respectively, in 16,821 atoms of a sample. It is highly desirable to prepare large quantities of uranium enriched with the thermal-neutron fissionable isotope $U^{235}$ for commercial purposes, and it has been found that this end can be accomplished by employing the calutron method. However, it is desirable that the uranium product have an enrichment factor with respect to $U^{235}$ of the order of 400, this factor being defined as the quotient obtained by dividing the ratio of $U^{235}$ to $U^{238}$ in the product with the ratio of $U^{235}$ to $U^{238}$ in the original material. Now assuming that the product is enriched by 400 in both $U^{235}$ and $U^{234}$, it comprises $U^{238}$, $U^{235}$ and $U^{234}$ in the approximate relative abundances 1, 400/139 and 400/16,700 (in numbers of atoms with reference to $U^{238}$), respectively, or approximately 16,700, 48,057 and 400 atoms, respectively, in 65,157 atoms of a sample. Thus the enriched uranium product comprises approximately 25.7% $U^{238}$, 73.7% $U^{235}$ and 0.6% $U^{234}$.

In order to obtain this desired enrichment of the uranium product by utilizing the calutron method, it has been found most convenient to use first-stage and second-stage calutrons, the first-stage calutrons employing natural or normal uranium and producing a first-stage enriched product having an enrichment factor of the order of 20 with respect to natural or normal uranium; and the second-stage calutrons employing first-stage enriched uranium and producing a second-stage enriched product having an enrichment factor of the order of 20 with respect to the first-stage enriched uranium, whereby the second-stage enriched uranium product has a final enrichment factor of the order 400 with respect to natural or normal uranium. By employing the present process, whereby the ultimate enrichment of the final uranium product is obtained in two stages, as indicated above, each of the first-stage and the second-stage calutrons may be operated in the stable range and to give a maximum yield of enriched material, Accordingly, in the present process it will be understood that in the event the calutron 10 comprises a first-stage calutron, the deposit of uranium in the pocket 37 in the collector block 35 has been impoverished with respect to the desired isotope $U^{235}$, and is recovered therefrom and discarded; while the deposit of uranium in the pocket 36 in the collector block 35 has been singly enriched with respect to the desired isotope $U^{235}$, and is recovered therefrom and subsequently treated in a second-stage calutron. On the other hand, in the event the calutron 10 comprises a second-stage calutron, the deposit of uranium in the pocket 37 in the collector block 35 has been first enriched and then impoverished with respect to the desired isotope $U^{235}$, and is recovered therefrom and analyzed for $U^{235}$ content to determine its suitability for possible recycling in a first-stage calutron; while the deposit of uranium in the pocket 36 in the collector block 35 has been doubly enriched with respect to the desired isotope $U^{235}$, and is recovered therefrom for commercial use.

Thus it will be understood that in a first-stage calutron, the deposit of metallic uranium in the pocket 36 in the collector block 35 has been subjected to one treatment and is termed "singly enriched" uranium, the enrichment being with respect to the desired isotope, $U^{235}$; on the other hand, in a second-stage calutron the deposit of metallic uranium in the pocket 36 in the collector block 35 has been subjected to two treatments, and is termed "doubly enriched" uranium, the enrichment being with respect to the desired isotope $U^{235}$.

Considering now the process in greater detail, it will be understood that a plant arranged to carry out the process will comprise a relatively large number of first-stage calutrons and a relatively small number of second-stage calutrons, in addition to facilities for handling, storing, recovering, purifying and converting the various metallic and compound forms of uranium. The starting material employed as a charge in the first-stage calutron is $UCl_4$, comprising natural or normal uranium, whereby metallic uranium singly enriched with $U^{235}$ is deposited in the first pocket of the collector and metallic uranium impoverished with respect to $U^{235}$ is deposited in the second pocket of the collector. Also, a large amount of $UCl_4$ is deposited as a residue upon the parts of the first-stage calutron disposed in the source region thereof, the deposit being primarily on the source-region end of the liner. After several charges of $UCl_4$, comprising natural or normal uranium, have been employed in the first-stage calutron, reasonable deposits of metallic uranium have been collected in the first and second pockets of the collector, and the metallic uranium deposits in the collector and the $UCl_4$ residue on the liner are recovered.

More particularly, the metallic uranium singly enriched with $U^{235}$ and deposited in the first pocket of the collector is recovered by an acid wash process, whereby various impurities including iron, chromium and nickel are introduced in the wash solution, due to the fact that the collector of the first-stage calutron which is thus washed with acid is formed of the metals mentioned. Accordingly, the wash solution containing the uranium singly enriched with $U^{235}$ which has been reclaimed contains considerable impurities. This wash solution is stored and subsequently employed as makeup material in a purification process utilized in conjunction with the second-stage calutron, in a manner more fully explained hereinafter. The metallic uranium impoverished with respect to $U^{235}$ and deposited in the second pocket of the collector is recovered by an acid wash process and discarded, as it contains so little $U^{235}$ that further processing thereof is not feasible.

The residue of $UCl_4$ deposited on the parts of the first-stage calutron disposed in the source region thereof, principally upon the liner, is recovered by a water wash process, whereby various impurities including copper, iron, chromium, nickel and carbon are introduced in the wash solution, due to the fact that the various parts of the first-stage calutron which are thus washed with water are formed of the materials mentioned. Accordingly, the wash solution containing natural or normal uranium which has been reclaimed, contains considerable impurities. To this wash solution there is added makeup material in the form of a wash solution derived from the second-stage calutron, and comprising the wash solution from the second pocket of the collector, and containing uranium which has been first enriched with $U^{235}$ in the first-stage calutron and subsequently impoverished with respect to $U^{235}$ in the second-stage calutron, as explained more fully hereinafter. This composite wash solution is then purified in order to eliminate the impurities mentioned; the impurities thus eliminated are discarded; and the uranium thus purified is then converted back to the compound $UCl_4$. This compound of $UCl_4$ is then employed, along with a suitable amount of makeup $UCl_4$, as a charge in the first-stage calutron.

Accordingly, the residue of $UCl_4$ deposited in the source region of the first-stage calutron is treated to render it recyclable therein; the first-stage enriched uranium is stored for use in the second-stage calutron; and the first-stage impoverished uranium is discarded.

The starting material employed as a charge in the second-stage calutron is $UCl_4$, comprising singly enriched uranium, whereby metallic uranium doubly enriched with $U^{235}$ is deposited in the first pocket of the collector and metallic uranium which has been first enriched in the first-stage calutron and then impoverished in the second-stage calutron is deposited in the second pocket of the collector. Also, a large amount of $UCl_4$ is deposited as a residue upon the parts of the second-stage calutron disposed in the source region thereof, the deposit being primarily on the source-region end of the liner. After several charges of $UCl_4$ comprising singly enriched uranium have been employed in the second-stage calutron, reasonable deposits of metallic uranium have been collected in the first and second pockets of the collector, and the metallic uranium deposits in the collector and the $UCl_4$ residue on the liner are recovered.

More particularly, the metallic uranium doubly enriched with $U^{235}$ and deposited in the first pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium doubly enriched with $U^{235}$ which has been reclaimed contains considerable impurities. This wash solution is then purified in order to eliminate the impurities mentioned; the impurities thus eliminated are discarded or salvaged; and the uranium thus purified is converted into a standard compound of uranium for commercial use. The metallic uranium first enriched with $U^{235}$ and subsequently impoverished with respect to $U^{235}$ and deposited in the second pocket of the collector is recovered by an acid wash process, whereby various impurities including iron, chromium and nickel are introduced in the wash solution, due to the fact that the collector of the second-stage calutron which is thus washed with acid is formed of the metals mentioned. Accordingly, the wash solution containing the uranium first enriched with $U^{235}$ and subsequently impoverished with respect to $U^{235}$ which has been reclaimed contains considerable impurities. The uranium in the wash solution is then analyzed, and in the event it contains at least as much $U^{235}$ as natural or normal uranium, it is employed as makeup material in the purification process utilized in conjunction with the first-stage calutron.

The residue of $UCl_4$ deposited on the parts of the second-stage calutron disposed in the source region thereof, principally upon the liner, is recovered by a water wash process, whereby various impurities including copper, iron, chromium, nickel and carbon are introduced in the wash solution due to the fact that the various parts of the second-stage calutron which are thus washed with water are formed of the materials mentioned. Accordingly, the wash solution containing the singly enriched uranium which has been reclaimed contains considerable impurities. To this wash solution there is added the previously stored makeup material in the form of the wash solution derived from the first-stage calutron and comprising the acid wash solution from the first pocket of the collector of the first-stage calutron and containing singly enriched uranium. This composite wash solution is then purified in order to eliminate the impurities mentioned; the impurities thus eliminated are discarded or salvaged; and the uranium thus purified is then converted back to the compound $UCl_4$. This compound of $UCl_4$ is then employed as a charge in the second-stage calutron.

Accordingly, the residue of $UCl_4$ deposited in the source region of the second-stage calutron is treated to render it re-cyclable therein; the second-stage enriched uranium is converted to a standard compound of uranium to be used commercially; and the second-stage improverished uranium is stored for use in the first-stage calutron.

Considering now the details of the recovery of the $UCl_4$ residue from the parts of either a first-stage or a second-stage calutron disposed in the source region thereof, reference is made to the portion of the flow diagram illustrated in Fig. 2. The parts of calutron disposed in the source region thereof, principally the source-region end of the liner, are scrubbed and washed with hot water, whereby the residue of $UCl_4$ deposited thereon is dissolved; and various impurities including copper, iron, chromium, nickel and carbon, are introduced in the water wash, due to the fact that the various parts of the calutron which are thus washed with hot water are formed of the materials mentioned. The wash water is then sieved in order ot remove any solid impurities which may be picked up, such, for example, as small pieces of metal and carbon. These solid impurities may be either discarded or subjected to salvage treatment in order to recover any occluded uranium. The sieved wash water is then treated with $H_2O_2$ by adding a slight excess of ten percent $H_2O_2$ and agitating the solution in order to oxidize the various contained materials. For example, prior to the step of oxidation the wash water may contain suspended $U(OH)_4$ and bits of copper and carbon, dissolved uranium in the +4 and +6 valence states, as well as dissolved copper, iron, nickel, chromium and possibly other metals in one or more of the positive valence states. Hence, as a result of oxidation all of the uranium is put in solution as uranyl ion, suspended copper is put in solution as cupric ion, and other dissolved materials are put in their higher stable valence states, if they are not already in such state. Carbon is not oxidized by this treatment. The effect of the oxidation on the various materials contained in the wash solution may be indicated as follows:

$$U^{++++} \rightarrow UO_2^{++}$$
$$UO_2^{++} \rightarrow UO_2^{++}$$
$$U(OH)_4 \rightarrow UO_2^{++}$$
$$Cu^0 \rightarrow Cu^{++}$$
$$CuCl \rightarrow Cu^{++}$$
$$Cu_2O \rightarrow Cu^{++}$$
$$Fe^{++} \rightarrow Fe^{+++}$$
$$Cr^{+++} \rightarrow Cr^{+++}$$
$$Ni^{++} \rightarrow Ni^{++}$$
$$C^0 \rightarrow C^0$$

Accordingly, the oxidized wash water contains at least the following $UO_2^{++}$, $Cu^{++}$, $Fe^{+++}$, $Cr^{+++}$, $Ni^{++}$ and and $C^0$ (carbon). The oxidized wash water is then filtered in order to remove $C^0$, which may be discarded or subjected to salvage treatment in order to recover any occluded uranium.

In the event this filtrate is rather dilute, it may be concentrated by evaporation; otherwise, this step is omitted. In the event the filtrate is concentrated by evaporation, the water vapor which is driven off is condensed and to it is added enough makeup water in order to provide a new wash solution, which is used again to wash the parts of the calutron disposed in the source region thereof, in the manner previously explained. This step, comprising condensing and reusing the water vapor which is driven off the filtrate incident to concentration by evaporation, is advantageous in view of the fact that any uranium entrained in the water vapor is not lost to the outside. The original filtrate mentioned above, or the concentrated filtrate following evaporation, in the event this step is employed, is then stored for further treatment.

It will be understood that the stored water wash derived from the parts of the first-stage calutron disposed in the source region thereof, as explained above, comprises uranium of natural or normal composition with reference to $U^{235}$; while the stored water wash derived from the parts of the second-stage calutron disposed in the source region thereof, as explained above, comprises uranium which is singly enriched with $U^{235}$.

Considering now the details of the recovery of the metallic uranium, singly enriched with $U^{235}$, from the first pocket of the collector of the first-stage calutron, or of the metallic uranium, doubly enriched with $U^{235}$, from the first pocket of the collector of the second-stage calutron, reference is made to the portion of the flow diagram illustrated in Fig. 3. The inner surfaces of the first pocket of the collector of the calutron are etched with one of a number of acid solutions, whereby the deposit of metallic uranium, either singly or doubly enriched with $U^{235}$, is dissolved; and various impurities including iron, chromium and nickel are introduced in the acid wash solution, due to the fact that the inner surfaces of the first pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$ and $Ni^{++}$.

A suitable acid wash solution which may be employed for the purpose mentioned comprises an aqueous solution containing $HNO_3$ (approximately twelve percent). Another suitable acid wash solution comprises an aqueous solution containing $HCl$ (approximately two percent) and $H_2O_2$ (approximately 0.5 percent). A further suitable acid wash solution comprises an aqueous solution containing $H_2SO_4$ (approximately eighten percent) and $H_2O_2$ (approximately ten percent). Thus, it will be understood that the first acid wash solution comprises an oxidizing acid, whereas the second and third acid wash solutions comprise a separate oxidizing agent in the form of $H_2O_2$. Hence, the acid wash solution employed in any case produces an oxidizing effect upon both the uranium and the metal impurities which are dissolved therein.

In the event the wash acid is rather dilute in the ions mentioned, it may be concentrated by evaporation; otherwise this step is omitted. In the event the wash acid is concentrated by evaporation, the vapor which is driven off is condensed and to it is added enough makeup $HNO_3$, or $HCl$ and $H_2O_2$, or $H_2SO_4$ and $H_2O_2$, depending upon the composition of the original wash acid employed, in order to provide a new wash acid which is again used to wash the first pocket of the collector of the calutron, in the manner previously explained. This step, comprising condensing the vapor which is driven off the wash acid incident to concentration by evaporation, is advantageous in view of the fact that any uranium entrained in the vapor is not lost to the outside. The original wash acid mentioned above, or the concentrated wash acid following evaporation, in the event this step is employed, is then stored for further treatment.

It will be understood that the stored acid wash derived from the first pocket of the collector of the first-stage calutron, as explained above, comprises uranium which is singly enriched with $U^{235}$; while the stored acid wash derived from the first pocket of the collector of the second-stage calutron, as explained above, comprises uranium which is doubly enriched with $U^{235}$.

The metallic uranium, impoverished with respect to $U^{235}$ and deposited in the second pocket of the collector of the first-stage calutron, may be recovered merely by etching the inner surfaces of the second pocket of this collector with a suitable wash acid of the character mentioned above, whereby this deposit of metallic uranium is dissolved. This acid wash is then discarded, as it contains so little $U^{235}$ that further processing thereof is not feasible.

On the other hand, the metallic uranium which has been first enriched with respect to $U^{235}$ and subsequently impoverished with respect to $U^{235}$, and deposited in the second pocket of the collector of the second-stage calutron, may be recovered by etching the inner surfaces of the second pocket of this collector with a suitable wash acid of the character mentioned above, whereby this deposit of metallic uranium is dissolved; and various impurities, including iron, chromium and nickel are introduced in the acid wash solution, due to the fact that the inner surfaces of the second pocket of the collector of the calutron which are thus etched with the acid solution are formed of stainless steel which comprises the materials mentioned. Accordingly, the wash acid contains at least the following ions: $UO_2^{++}$, $Fe^{+++}$, $Cr^{+++}$ and $Ni^{++}$. The considerations concerning whether the wash acid should be concentrated are the same as those previously noted. In any case, either the original wash acid mentioned above, or the concentrated wash acid following evaporation, in the event this step is employed, is then analyzed in order to determine the $U^{235}$ content thereof. In the event the analysis indicates that the $U^{235}$ content of this wash acid is at least as great as natural or normal uranium, it is stored for further treatment; on the other hand, in the event the analysis indicates that the $U^{235}$ content of this wash acid is less than that of natural or normal uranium, it is discarded, as further processing thereof is not feasible.

To the stored water wash solution derived from the parts of the first-stage calutron disposed in the source region thereof, there is added the stored acid wash solution derived from the second pocket of the collector of the second-stage calutron in order to produce a first composite solution; this first composite solution comprises uranium of substantially natural or normal composition with reference to $U^{235}$. Also, to the stored water wash solution derived from the parts of the second-stage calutron disposed in the source region thereof, there is added the stored acid wash solution derived from the first pocket of the collector of the first-stage calutron in order to produce a second composite solution; this second composite solution comprises uranium which is singly enriched with $U^{235}$. Finally, the stored acid wash solution derived from the first pocket of the collector of the second-stage calutron constitutes a third composite solution; this third composite solution comprises uranium which is doubly enriched with $U^{235}$.

Considering now the details of the purification of one of the composite solutions described above, comprising the following ions: $UO_2^{++}$, $Cu^{++}$, $Fe^{+++}$, $Cr^{+++}$ and $Ni^{++}$, reference is made to the portion of the flow diagram illustrated in Fig. 4. The pH of the solution is adjusted within the approximate range 0.1 to 0.6 by the addition thereto of $HNO_3$ or $NaOH$, depending upon the original pH of the solution. The concentration of uranyl ion is brought within the approximate range 0.6 to 0.2 molar. To this solution there is then added $NaNO_3$ or $NaCl$, whereby the concentration of sodium ion is within the approximate range 1.0 to 2.0 molar. The temperature of the solution is then adjusted to about room temperature, approximately 70° F., and there is added thereto sufficient solid sodium acetate so that after precipitation of the uranium as sodium uranyl acetate the molar concentration ratio of acetic acid to acetate ion is within the approximate range 2.0 to 2.5 (i. e., the pH of the solution is within the approximate corresponding range 4.46 to 4.36). The procedure described above, wherein the sodium uranyl acetate is precipitated in the acetic acid solution of which the pH is approximately 4.46 to 4.36, is very advantageous in view of the fact that this acidity of the solution prevents the precipitation of slight traces of iron and other of the metal impurities. Normally $Fe^{+++}$ precipitates at a substantially lower pH than that corresponding to the pH range just mentioned. However, in this case, apparently due to complexing with the acetate ion, the $Fe^{+++}$ does not precipitate even at a pH of 4.46.

It will be noted that, according to the foregoing procedure wherein $NaNO_3$ or $NaCl$ is added to the solution prior to the sodium uranyl acetate precipitation step, advantage is taken of the "common ion" effect to increase the concentration of $Na^+$ ion in the solution and thus to enhance the effectiveness of the uranium separation.

Instead of following the above procedure, wherein the solution is first acidified so that when sodium acetate is added thereto an acetic acid solution is formed, an alternative procedure may be followed. More particularly, the step of adjusting the pH of the original solution, in order to bring it to the stipulated acidity, may be omitted, and to the original solution there may be added directly a mixture of glacial acetic acid and solid sodium acetate, whereby the uranium is precipitated as sodium uranyl acetate, as previously noted. In this case, the ratio of the mixture of acetic acid and sodium acetate added to the original solution is such that after precipitation of the sodium uranyl acetate, the molar concentration ratio of acetic acid to acetate ion is within the approximate range 2.0 to 2.5 (i. e., the pH of the acetic acid solution is within the approximate corresponding range 4.46 to 4.36), for the purpose previously noted.

In any event, the uranium is precipitated as sodium uranyl acetate away from the metal impurities, such as copper, iron, chromium, nickel, etc., in the acetic acid solution, the ions $Cu^{++}$, $Fe^{+++}$, $Cr^{+++}$, $Ni^{++}$, etc., being highly soluble in the acetic acid solution. This procedure, utilizing the precipitation of uranium as sodium uranyl acetate in acetic acid solution, is very advantageous, in view of the fact that sodium uranyl acetate is insoluble to the approximate extent of 99.5% therein, while the acetates of the metal impurities mentioned are highly soluble therein.

The solution is then filtered and the sodium uranyl acetate precipitate is washed with an aqueous solution which is about 2.0 molar in sodium ion and 0.4 molar in acetic acid and about 0.2 molar in acetate ion. This washing of the sodium uranyl acetate with the aqueous solution mentioned carries any slight amounts of occluded metal impurities into the filtrate, and is of the required composition to prevent any appreciable dissolution of the sodium uranyl acetate precipitate. The filtrate containing the $Cu^{++}$, $Fe^{+++}$, $Cr^{+++}$ and $Ni^{++}$ ions is then discarded or subjected to salvage treatment in order to recover any uranium contained.

The effectiveness of the foregoing procedure in the reclamation of the uranium from a solution will be readily appreciated from the following example. A solution comprising about 9 liters containing approximately 950 grams of uranium, as uranyl nitrate, as well as ferric and chromic nitrates as impurities, was treated with nitric acid to bring the pH to about 0.3; and then about 850 grams of solid sodium nitrate was dissolved in the solution. Precipitation was brought about by adding approximately 1500 grams of anhydrous solid sodium acetate to the solution and stirring. The solution was then filtered and the precipitate was washed with an aqueous solution which was approximately 2.5 molar in sodium ion and 0.4 molar in acetic acid and about 0.2 molar in acetate ion. The precipitate contained about 945 grams of uranium as sodium uranyl acetate, while the filtrate contained only about 5 grams of the uranium and virtually all of the iron and chromium. Thus, a recovery of approximately 99.5% of the uranium from the solution was realized in this purification procedure.

The sodium uranyl acetate precipitate is then dissolved in dilute HCl, whereby the solution contains $UO_2^{++}$ and $Na^+$ ions. The solution is then reduced in any suitable manner, whereby the uranium ion is reduced to its lower valence state. For example, the solution may be electrolytically reduced in the manner disclosed in the copending application of Martin D. Kamen, Serial No. 532,160, filed April 21, 1944.

The reduced solution now contains $U^{++++}$ and $Na^+$ ions, and is treated with $NH_4OH$ in order to precipitate the uranium as $U(OH)_4$ away from the sodium in the solution. The solution is then filtered and the uranium hydroxide precipitate is washed with an aqueous solution containing about one percent $NH_4OH$ and one percent $NH_4Cl$, carrying occluded sodium ion into the filtrate. The uranium thus purified and in the compound form $U(OH)_4$ is then stored for further treatment or commercial use, as previously noted. The filtrate containing the $Na^+$ ion is then discarded or subjected to salvage treatment in order to recover any uranium contained.

It will be understood that the purification of the first composite solution in the manner described above is productive of a first batch of $U(OH)_4$ containing uranium of substantially natural or normal composition with reference to $U^{235}$. Also, the purification of the second composite solution in the manner described above is productive of a second batch of $U(OH)_4$ containing uranium which is singly enriched with $U^{235}$. Finally, the purification of the third composite solution in the manner described above is productive of a third batch of $U(OH)_4$ containing uranium which is doubly enriched with $U^{235}$. The first and second batches of $U(OH)_4$ are then converted back to $UCl_4$ for retreatment in the first-stage and second-stage calutrons, respectively; while the third batch of $U(OH)_4$ is available for commercial use.

Considering now the details of the ultimate conversion of either the first batch or the second batch of $U(OH)_4$ to $UCl_4$, reference is made to the portion of the flow diagram illustrated in Fig. 5. More particularly, a batch of $U(OH)_4$ is calcined in an inert or reducing atmosphere, such as nitrogen or hydrogen, at approximately 250° C. in order to produce $UO_2$, whereby water vapor is given off incident to the calcination. The uranium dioxide is then reacted with $CCl_4$ in the vapor phase at approximately 450° C. in a suitable reaction chamber, in order to produce crude $UCl_4$, whereby $COCl_2$, $CO_2$, $CO$ and $Cl_2$ gases are given off incident to the reaction. The crude uranium tetrachloride thus produced is then sublimed in a suitable molecular still at approximately 600° C. in order to produce a sublimate of $UCl_4$, whereby residues of $UO_2$ and $UOCl_2$ are produced incident to the sublimation. The residues of $UO_2$ and $UOCl_2$ are ultimately converted to $UCl_4$. The $UCl_4$ thus produced is of very pure form and is suitable for recycling in the appropriate one of the first-stage or second-stage calutrons, in the manner previously explained. More particularly, the conversion of the first batch of $U(OH)_4$ is productive of a first batch of $UCl_4$ containing uranium of substantially natural or normal composition with reference to $U^{235}$; this first batch of $UCl_4$ is recycled in the first-stage calutron. Also, the conversion of the second batch of $U(OH)_4$ is productive of a second batch of $UCl_4$ containing uranium singly enriched with $U^{235}$; this second batch of $UCl_4$ is recycled in the second-stage calutron.

The present process of recovering uranium from wash solutions derived from calutrons is very effective, in view of the fact that the precipitation of uranium as sodium uranyl acetate is highly selective and specific reaction for uranium. Thus, not only may uranium be reclaimed from a wash solution containing the impurities mentioned, copper, iron, chromium and nickel, but the wash solution may contain a very large variety of other impurities, such as manganese, without interfering with the separation of uranium as sodium uranyl acetate. Moreover, the purification can be carried out as explained without particular reference to the identification of the named impurities or the proportions contained in the wash solution; this feature is very advantageous, in view of the fact that both the particular impurities as well as the related quantities thereof vary considerably among the different wash solutions derived from the different calutrons.

In view of the foregoing, it is apparent that there has been provided an improved process of recovering, reclaiming, purifying and converting uranium, both in metallic and compound forms, in conjunction with the calutron method, whereby uranium enriched with $U^{235}$ may be produced on a large scale in commercial quantities.

Also, it will be understood that the present process may be suitably modified so that a compound of uranium other than $UCl_4$ may be treated either in the first-stage or in the second-stage calutron. For example, the calutron, as well as the conversion steps of the process, may be modified, whereby $UCl_6$, $UBr_4$, etc. may be treated in order to produce uranium enriched with $U^{235}$.

The term "uranium" is employed in the present specification and claims in a generic sense; i. e., as applying to uranium whether present in elemental, ionic or compound form, unless indicated otherwise by the context.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. In a process for recovering uranium values from deposits formed upon the parts of a calutron which parts contain a metal of the group consisting of iron, copper, chromium and nickel, the steps comprising washing said parts with a solvent selected from the group consisting of sulfuric acid containing hydrogen peroxide, hydrochloric acid containing hydrogen peroxide and nitric acid to produce a wash solution containing said uranium and said metals as impurities, treating the wash solution with sodium acetate to precipitate the uranium as sodium uranyl acetate away from the metal impurities in the solution, filtering the solution in order to separate the sodium uranyl acetate precipitate from the metal impurities in the filtrate, dissolving the sodium uranyl acetate precipitate in acid, reducing the uranium in the solution to the uranous state, treating the solution with ammonia to precipitate the uranium as uranous hydroxide away from the sodium in the solution, and then filtering the solution in order to separate the uranous hydroxide precipitate from the sodium in the filtrate.

2. In a process for recovering uranium values from deposits formed upon the parts of a calutron which parts contain a metal of the group consisting of iron, copper, chromium and nickel, the steps comprising washing said parts with a solvent selected from the group consisting of sulfuric acid containing hydrogen peroxide, hydrochloric acid containing hydrogen peroxide and nitric acid to produce a wash solution containing said uranium and said metals as impurities, treating the wash solution with sodium acetate to precipitate the uranium as sodium uranyl acetate away from the metal impurities in the solution, filtering the solution in order to separate the sodium uranyl acetate precipitate from the metal impurities in the filtrate, dissolving the sodium uranyl acetate precipitate in acid, reducing the uranium in the solution to the uranous state, treating the solution with ammonia to precipitate the uranium as uranous hydroxide away from the sodium in the solution, filtering the solution in order to separate the uranous hydroxide precipitate from the sodium in the filtrate, and then calcining the uranous hydroxide precipitate to produce uranium dioxide.

3. In a process for recovering uranium which has been deposited upon a surface containing metals of the group consisting of copper, iron, chromium, and nickel, the steps comprising washing said surface with an aqueous solvent for the uranium whereby there is obtained an acidic aqueous solution containing uranium and metals of said group as impurities, treating said acidic solution with sodium acetate to precipitate the uranium as sodium uranyl acetate away from said impurities in the solution, and separating said sodium uranyl acetate from said solution.

4. In a process for recovering uranium which has been deposited upon calutron parts containing metals of the group consisting of copper, iron, chromium, and nickel, the steps comprising washing said parts with an aqueous solvent for the uranium thereby producing an acidic aqueous solution containing uranium with metals of said group as an impurity, treating said solution with sodium acetate and acetic acid to precipitate the uranium as sodium uranyl acetate away from the metal impurities in the solution and in such a manner that the resulting pH of the solution is less than about pH 4.5, and separating the sodium uranyl acetate from the solution.

5. In a process for recovering uranium which has been deposited upon calutron parts which contain metals of the group consisting of copper, iron, chromium, and nickel, the steps comprising washing said parts with an aqueous solvent for the uranium thereby producing an acidic aqueous solution containing uranium and metals of said group as impurities, treating said solution with sodium chloride to increase the sodium ion concentration of the solution, adding sodium acetate to said solution in order to precipitate the uranium as sodium uranyl acetate away from the impurities in the solution, and separating said sodium uranyl acetate from said solution.

6. In a process for recovering uranium values from deposits formed on the parts of a calutron which parts contain metals of the group consisting of copper, iron, chromium and nickel, the steps comprising washing said parts with an aqueous solvent for the uranium to produce a solution containing said uranium together with said metals as impurities, acidifying said solution, adding sodium acetate to said acidified solution while retaining the pH thereof at a value below about 4.5 to precipitate said uranium as sodium uranyl acetate away from the impurities in said solution, and separating said sodium uranyl acetate from the solution.

7. In a process for recovering uranium values from deposits formed on the parts of a calutron which parts contain metals of the group consisting of copper, iron, chromium and nickel, the steps comprising washing said parts with a solvent selected from the group consisting of sulfuric acid containing hydrogen peroxide, hydrochloric acid containing hydrogen peroxide and nitric acid to produce a solution containing said uranium together with said metals as impurities, acidifying said solution, adding sodium acetate to said acidified solution to produce acetic acid therein and to precipitate said uranium as sodium uranyl acetate away from the impurities in said acetic acid solution, filtering said sodium uranyl acetate from the solution, and washing said sodium uranyl acetate with a solution which is about 2.0 molar in sodium ion and about 0.4 molar in acetic acid and about 0.2 molar in acetate ion.

8. In a process for recovering uranium values from deposits formed on the parts of a calutron which parts contain a metal of the group consisting of copper, iron, chromium and nickel, the steps comprising washing said parts with a solvent selected from the group consisting of sulfuric acid containing hydrogen peroxide, hydrochloric acid containing hydrogen peroxide and nitric acid to produce a solution containing said uranium together with said metals as impurities, adding acetic acid and sodium acetate to said solution in amounts sufficient to precipitate said uranium as sodium uranyl acetate away from the impurities in solution and insufficient in amount to raise the pH of the solution above about 4.5, and separating said sodium uranyl acetate from the solution.

9. The process for recovering uranium values from the residue of uranium tetrachloride deposited on the parts of a calutron disposed in the source region thereof which parts contain metals of the group consisting of copper, iron, chromium and nickel comprising washing said parts with water to produce a solution containing said uranium together with said metals as impurities, oxidizing said solution, treating said oxidized solution with sodium acetate and acetic acid while maintaining the pH below about 4.5 to precipitate said uranium as sodium uranyl acetate away from the impurities in solution, and separating said uranyl acetate from the solution.

10. In a process for recovering metallic uranium values from the collector of a calutron upon which it has been deposited and which collector is composed of materials, having as a constituent thereof, metals of the group consisting of copper, iron, chromium and nickel, the steps comprising washing said parts with an aqueous acidic oxidizing solvent to form an oxidized solution containing said uranium and said metals as impurities, treating said solution with sodium acetate, acetic acid and sodium chloride to precipitate said uranium as sodium uranyl acetate away from the impurities in the solution, separating said sodium uranyl acetate from the solution, dissolving said sodium uranyl acetate in hydrochloric acid, reducing the uranium in said solution from the uranyl to the uranous state, and precipitating said uranium with ammonia as uranous hydroxide away from the sodium in the solution.

11. In a process for recovering uranium values from deposits formed upon the parts of a calutron which parts contain a metal of the group consisting of iron, copper, chromium and nickel that comprises washing said parts with an aqueous solvent selected from the group consisting of sulfuric acid containing hydrogen peroxide, hydrochloric acid containing hydrogen peroxide and nitric acid to yield a wash solution containing said uranium and said metals as impurities, treating said wash solution with sodium acetate to precipitate the uranium as sodium uranyl acetate away from the metal impurities in said solution, and then separating said sodium uranyl acetate from the solution; the steps comprising adding sodium nitrate to said wash solution prior to treatment with sodium acetate to produce a "common ion" effect with the addition of said sodium acetate to increase the effectiveness of the uranium separation.

12. The process as in claim 11, wherein sodium chloride is substituted for said sodium nitrate.

13. The process as in claim 10, wherein said uranium values comprise uranium isotope 238 values.

14. The process for recovering uranium values from a solution containing $UO_2^{++}$, $Cu^{++}$, $Fe^{+++}$, $Cr^{+++}$ and $Ni^{++}$, comprising adjusting the pH of said solution to within the range of about 0.1 to 0.6 and the $UO_2^{++}$ concentration to within the range of about 0.2 to 0.6 molar, adding NaCl to said solution to provide a concentration of sodium ion in said solution in the range of about 1.0 to 2.0 molar, adding sodium acetate to said solution while maintaining the temperature of said solution below about 70° C. to adjust the pH thereof to the range of about 4.36 to 4.46 and to precipitate the $UO_2^{++}$ as sodium uranyl acetate, filtering said sodium uranyl acetate from said solution, and washing residual traces of impurities from the filtered sodium uranyl acetate with a solution containing about 2.0 molar sodium ion, 0.4 molar acetic acid and 0.2 molar acetate ion.

15. The process as in claim 14, wherein said uranium values comprise uranium isotope 238 values.

References Cited in the file of this patent

Griffin: Technical Methods of Analysis, pp. 280, 281 (1921); publ. by McGraw-Hill Book Co., New York, N. Y.

Treadwell-Hall: Analytical Chemistry, 9th ed., vol. I, p. 49 (1937); publ. by John Wiley & Sons, New York, N. Y.

Furman: Scott's Standard Methods of Chemical Analysis, 5th ed., pp. 878–881 (1939); publ. by D. Van Nostrand, New York, N. Y.

Hopkins: "Chapters in the Chemistry of the Less Familiar Elements," vol. II, chapter 18, pp. 17, 18; Stipes Publ. Co., Champaign, Ill. (1939).